US012777366B2

(12) United States Patent
Hsu et al.

(10) Patent No.: US 12,777,366 B2
(45) Date of Patent: Oct. 27, 2026

(54) METHOD FOR REPORTING QUEUE SIZE OF STATION BY USING MULTIPLE MEDIUM ACCESS CONTROL HEADER FIELDS AND ASSOCIATED WIRELESS COMMUNICATION DEVICE

(71) Applicant: MEDIATEK INC., Hsin-Chu (TW)

(72) Inventors: Chien-Fang Hsu, Hsinchu City (TW); James Chih-Shi Yee, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/378,648

(22) Filed: Oct. 10, 2023

(65) Prior Publication Data

US 2024/0137803 A1 Apr. 25, 2024

Related U.S. Application Data

(60) Provisional application No. 63/379,458, filed on Oct. 14, 2022, provisional application No. 63/468,514, filed on May 23, 2023, provisional application No. 63/470,994, filed on Jun. 5, 2023.

(51) Int. Cl.
*H04W 28/02* (2009.01)
*H04W 28/06* (2009.01)

(52) U.S. Cl.
CPC ... *H04W 28/0278* (2013.01); *H04W 28/0268* (2013.01); *H04W 28/065* (2013.01)

(58) Field of Classification Search
CPC ......... H04W 28/0278; H04W 28/0268; H04W 28/065; H04W 28/02
See application file for complete search history.

(56) References Cited

U.S. PATENT DOCUMENTS

| | | | | |
|---|---|---|---|---|
| 2011/0007753 | A1* | 1/2011 | Agiwal | H04W 28/065 370/470 |
| 2011/0268031 | A1* | 11/2011 | Agiwal | H04W 80/02 370/328 |
| 2019/0007860 | A1 | 1/2019 | Hedayat | |
| 2019/0246312 | A1 | 8/2019 | Kim | |
| 2019/0261402 | A1* | 8/2019 | Asterjadhi | H04W 72/21 |
| 2023/0117842 | A1* | 4/2023 | Xin | H04W 28/0268 370/235 |
| 2024/0107369 | A1* | 3/2024 | Verma | H04W 28/0278 |

FOREIGN PATENT DOCUMENTS

WO WO-2022013437 A1 * 1/2022 ........ H04W 28/0278

* cited by examiner

*Primary Examiner* — Lan-Huong Truong
(74) *Attorney, Agent, or Firm* — Winston Hsu

(57) ABSTRACT

A wireless communication method includes: generating at least one frame, wherein the at least one frame is configured to include a first medium access control (MAC) header field and a second MAC header field, and a queue size (QS) is encoded in the first MAC header field and the second MAC header field; and sending the at least one frame to an access point (AP).

20 Claims, 2 Drawing Sheets

METHOD FOR REPORTING QUEUE SIZE OF STATION BY USING MULTIPLE MEDIUM ACCESS CONTROL HEADER FIELDS AND ASSOCIATED WIRELESS COMMUNICATION DEVICE

CROSS REFERENCE TO RELATED APPLICATIONS

This application claims the benefit of U.S. Provisional Application No. 63/379,458, filed on Oct. 14, 2022. Further, this application claims the benefit of U.S. Provisional Application No. 63/468,514, filed on May 23, 2023. Further, this application claims the benefit of U.S. Provisional Application No. 63/470,994, filed on Jun. 5, 2023. The contents of these applications are incorporated herein by reference.

BACKGROUND

The present invention relates to wireless communications, and more particularly, to a method for reporting a queue size of a station by using multiple medium access control (MAC) header fields and an associated wireless communication device.

In 802.11, a non-access-point (non-AP) station (STA) can report a queue size (QS) of a traffic identifier (TID) to an AP. For example, a QS subfield in a quality of service (QoS) control field of a MAC header is commonly used to inform the AP of how many data of a TID to be transmitted from the non-AP STA to the AP. The QS subfield is an 8-bit field that indicates the amount of buffered traffic to be transmitted, and consists of a scaling factor (SF) and an unscaled value (UV). The QS is encoded by SF and UV. The maximum QS that can be reported by the QS subfield <SF, UV>=<3, 62> set by a high-efficiency (HE) non-AP STA is 2,147,328 octets. However, with the development of the Wi-Fi technology, the amount of data to be reported may easily exceed the maximum QS that can be reported by the QS subfield in the QoS control field of the MAC header, where the amount of data to be reported may include the data within a physical layer (PHY) protocol data unit (PPDU) that reports the QS of the non-AP STA and the data waiting to be transmitted from the non-AP STA.

SUMMARY

One of the objectives of the claimed invention is to provide a method for reporting a queue size of a station by using multiple MAC header fields and an associated wireless communication device.

According to a first aspect of the present invention, an exemplary wireless communication method is disclosed. The exemplary wireless communication method includes: generating at least one frame, wherein said at least one frame is configured to include a first medium access control (MAC) header field and a second MAC header field, and a queue size (QS) is encoded in the first MAC header field and the second MAC header field; and sending said at least one frame to an access point (AP).

According to a second aspect of the present invention, an exemplary wireless communication method is disclosed. The exemplary wireless communication method includes: receiving at least one frame from a non-access-point (non-AP) station (STA), wherein said at least one frame includes a first medium access control (MAC) header field; and obtaining a queue size (QS) of the non-AP STA from parsing the first MAC header field and the second MAC header field.

According to a third aspect of the present invention, an exemplary wireless communication device is disclosed. The exemplary wireless communication device includes a network interface circuit and a control circuit. The control circuit is arranged to generate at least one frame, and instruct the network interface circuit to send said at least one frame, wherein said at least one frame is configured to include a first medium access control (MAC) header field and a second MAC header field, and a queue size (QS) is encoded in the first MAC header field and the second MAC header field.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
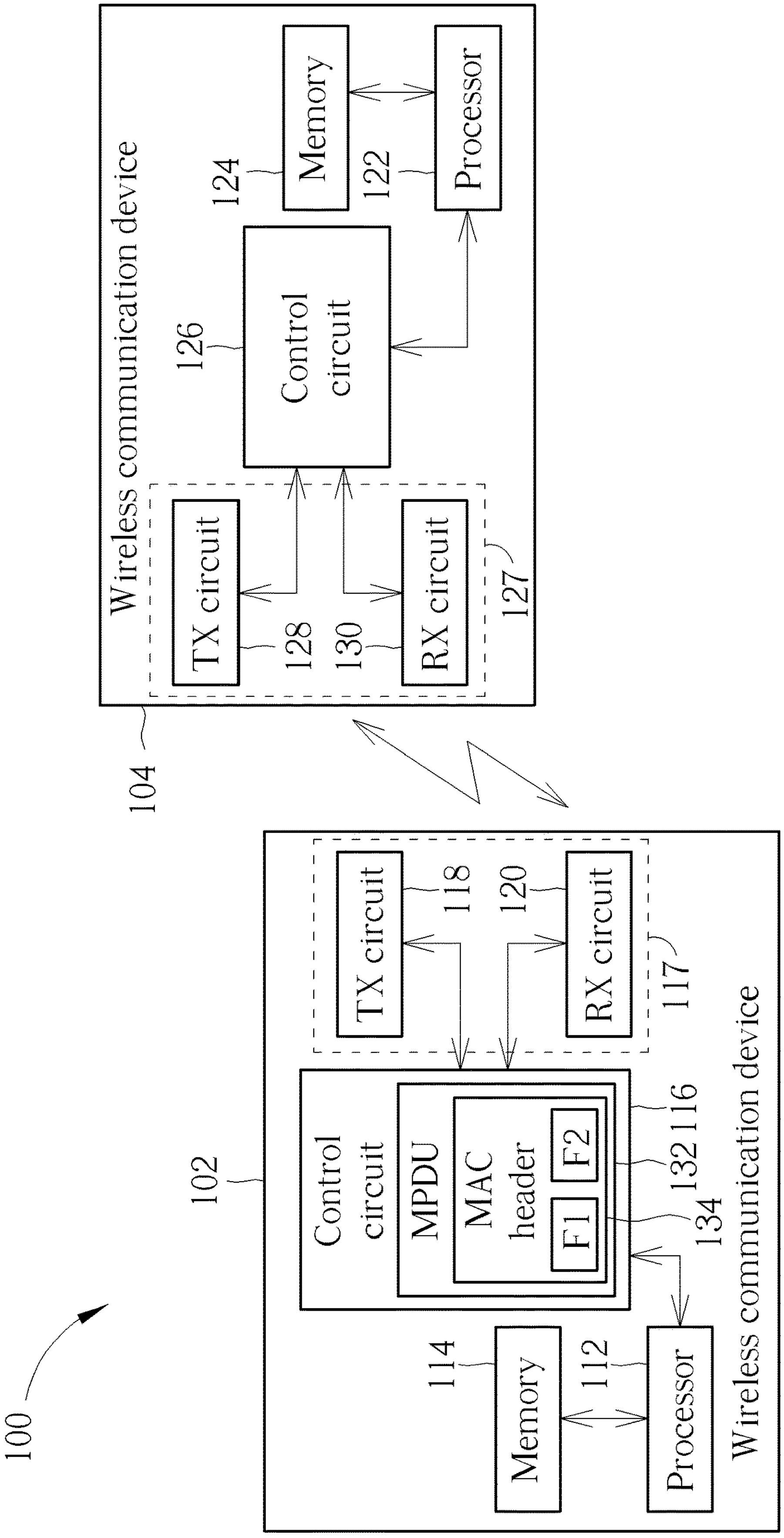
FIG. 1 is a diagram illustrating one wireless communication system that supports queue size extension according to an embodiment of the present invention.

FIG. 1 is a diagram illustrating one wireless communication system that supports queue size extension according to an embodiment of the present invention. The wireless communication system 100 includes a plurality of wireless communication devices 102 and 104. For example, the wireless communication system 100 is a Wi-Fi system, including an access point (AP) and a non-AP station (STA). In one embodiment of the present invention, the wireless communication device 102 maybe a non-AP STA, and the wireless communication device 104 may be an AP. For brevity and simplicity, only two wireless communication devices 102 and 104 are shown in FIG. 1. In practice, the wireless communication system 100 is allowed to have more than two wireless communication devices, including an AP and more than one non-AP STA in the same basic service set (BSS).

The wireless communication devices 102 and 104 may have the same or similar circuit structure. As shown in FIG. 1, the wireless communication device 102 includes a processor 112, a memory 114, a control circuit 116, and a network interface circuit 117, where the network interface circuit 117 includes a transmitter (TX) circuit 118 and a receiver (RX) circuit 120. The memory 114 is arranged to store a program code. The processor 112 is arranged to load and execute the program code to manage the wireless communication device 102. The control circuit 116 is arranged to control wireless communications with the wireless communication device 104. In a case where the wireless communication device 102 is a non-AP STA and the wireless communication device 104 is an AP, the control circuit 116 controls the TX circuit 118 of the network interface circuit 117 to deal with UL traffic between AP and non-AP STA, and controls the RX circuit 120 of the network interface circuit 118 to deal with DL traffic between AP and non-AP STA.

The wireless communication device 104 includes a processor 122, a memory 124, a control circuit 126, and a network interface circuit 127, where the network interface circuit 127 includes a TX circuit 128 and an RX circuit 130. The memory 124 is arranged to store a program code. The processor 122 is arranged to load and execute the program code to manage the wireless communication device 104. The control circuit 126 is arranged to control wireless communications with the wireless communication device 102. In a case where the wireless communication device 102 is a non-AP STA and the wireless communication device 104 is an AP, the control circuit 126 controls the TX circuit 128 of the network interface circuit 127 to deal with DL traffic between AP and non-AP STA, and controls the RX circuit 130 of the network interface circuit 117 to deal with UL traffic between AP and non-AP STA.

It should be noted that only the components pertinent to the present invention are illustrated in FIG. 1. In practice, the wireless communication device 102 may include additional components to achieve designated functions, and/or the wireless communication device 104 may include additional components to achieve designated functions.

In this embodiment, the wireless communication devices 102 and 104 both support the proposed queue size extension function. Hence, the control circuit 116 of the wireless communication device (e.g., non-AP STA) 102 generates a MAC protocol data unit (MPDU) 132 which is a MAC frame including a MAC header 134, where the MAC header 134 includes a first MAC header field F1 and a second MAC header field F2, and a queue size (QS) to be reported by the non-AP STA is encoded in the first MAC header field F1 and the second MAC header field F2. It should be noted that the MPDU 132 may also include a MAC service data unit (MSDU) (which is a frame body of the MAC frame) and a frame check sequence (FCS). For brevity and simplicity, the MPDU 132 is shown having the MAC header 134 only.

The control circuit 116 of the wireless communication device (e.g., non-AP STA) 102 instructs the network interface circuit 117 (particularly, TX circuit 118 of network interface circuit 117) to send the MPDU 132 (which carries QS information) to the wireless communication device (e.g., AP) 104. For example, the MPDU 132 becomes a physical layer (PHY) service data unit (PSDU) and is encapsulated into a PHY protocol data unit (PPDU) for transmission. The network interface circuit 127 (particularly, RX circuit 130 of network interface circuit 127) in the wireless communication device (e.g., AP) 104 receives the PPDU, and the control circuit 126 of the wireless communication device (e.g., AP) 104 decapsulates the PPDU to obtain the MPDU 132, and obtains the reported QS of the wireless communication device (e.g., non-AP STA) 102 from parsing the first MAC header field F1 and the second MAC header field F2 included in the same MAC header 134 of the received MPDU 132.

In this embodiment, the first MAC header field F1 may be a QoS control field, and the second MAC header field F2 may be a high-throughput (HT) control field. For example, the reported QS of the wireless communication device (e.g., non-AP STA) 102 is encoded in a QS subfield of the QoS control field (i.e., first MAC header field F1) and an aggregate-control (A-control) subfield of the HT control field (i.e., second MAC header field F2), where the HT control field is an HE variant HT control field. The A-control subfield in the HT control field (i.e., second MAC header field F2) acts as an extension of the QS subfield in the QoS control field (i.e., first MAC header field F1), and may have a format as illustrate in the following table.

TABLE 1

| Control ID value | Meaning | UV extension (UVE) |
|---|---|---|
| TBD | Extension of UV in Qos QS subfield | 6 bits |

Using the A-control subfield as an extension of the QS subfield needs no change to the current definition for an HE non-AP STA, and has no backward capability issue. By way of example, but not limitation, a value of a control ID subfield of the A-control subfield in the HT control field (i.e., second MAC header field F2) may be set by one of reserved control ID values to indicate that the control information carried by the A-control subfield includes queue size extension information. That is, the A-control subfield in the HT control field (i.e., second MAC header field F2) that is used to carry queue size extension information proposed by the present invention is different from legacy types of A-control subfields, including a triggered response scheduling (TRS) A-control subfield, an operating mode (OM) A-control subfield, an HE link adaption (HLA) A-control subfield, a buffer status report (BSR) A-control subfield, an UL power headroom (UPH) A-control subfield, a bandwidth query report (BQR) A-control subfield, and a command and status (CAS) A-control subfield.

When the wireless communication device (e.g., non-AP STA) 102 wants to report the QS larger than 2,147,328 octets (which is the maximum. QS that can be reported by the QS subfield in the QoS control field), the control circuit 116 first sets the QS subfield <SF, UV> of the QoS control field (i.e., first MAC header field F1) by <3, 62>, and then sets the UVE subfield of the A-control subfield in the HT control field (i.e., second MAC header field F2) to achieve the objective of reporting a more accurate and larger value than the maximum QS value supported by the QS subfield.

In some embodiments of the present invention, the SF applied in the A-control UVE is by default without extra indication. That is, the UVE subfield of the A-control subfield in the HT control field (i.e., second MAC header field F2) includes an UVE value only, and no SF is signaled via the A-control subfield in the HT control field (i.e., second MAC header field F2). That is, the AP employs the same default SF used by the non-AP STA, and can obtain the queue size extension by applying the same default SF to the UVE value signaled from the non-AP STA.

For example, a default SF (SF0=32,768) applied in the A-control UVE may be the same as the largest SF supported by the QS subfield of the QoS control field (i.e., first MAC header field F1). Hence, the UVE subfield may be set by a value determined using the following formula.

$$UVE = \text{ceil}\left(\frac{QS - 2{,}147{,}328}{SF0}\right) - 1 \quad (1)$$

Since the UVE subfield is a 6-bit subfield, the maximum UVE is 63 (i.e., $2^6-1$), and the maximum QS value that can be reported with aid of the additional UVE subfield is equal to 4,096,000 (i.e., 2,147,328+(UVE+1)*32,768=2,147,328+(63+1)*32,768).

For another example, a default SF (SF1=32,768*4) applied in the A-control UVE may be larger than the largest SF supported by the QS subfield of the QoS control field (i.e., first MAC header field F1). Hence, the UVE subfield may be set by a value determined using the following formula.

$$UVE = \text{ceil}\left(\frac{QS - 2{,}147{,}328}{SF1}\right) - 1 \quad (2)$$

Since the UVE subfield is a 6-bit subfield, the maximum UVE is 63 (i.e., $2^6-1$), and the maximum QS value that can be reported with aid of the additional UVE subfield is equal to 10,535,936 (i.e., 2,147,328+(UVE+1)*32,768*4=2,147,328+(63+1)*32,768*4).

Alternatively, the SF applied in the A-control UVE may also be signaled by the A-control subfield in the HT control field (i.e., second MAC header field F2). The A-control subfield in the HT control field (i.e., second MAC header field F2) acts as an extension of the QS subfield in the QoS control field (i.e., first MAC header field F1), and may have a format as illustrate in the following table.

TABLE 2

| Control ID value | Meaning | UV extension (UVE) |
|---|---|---|
| TBD | Extension of UV in QoS QS subfield | 1 (SF) bit + 6 (UVE) bits |

For example, when the SF bit in the UVE subfield is set by 0, the SF applied in the A-control UVE is SF0 (e.g., SF0=32,768*4). The 6-bit UVE value may be set by a value determined using the above formula (1).

For another example, when the SF bit in the UVE subfield is set by 1, the SF applied in the A-control UVE is SF1 (e.g., SF1=32,768*16). The 6-bit UVE subfield may be set by a value determined using the above formula (2).

In above embodiments, the A-control subfield in the HT control field (i.e., second MAC header field F2) that is used to carry queue size extension information proposed by the present invention is different from legacy A-control subfields. However, this is for illustrative purposes only, and is not meant to be a limitation of the present invention. In some embodiments of the present invention, a current BSR A-control subfield may be reused to act as the A-control subfield in the HT control field (i.e., second MAC header field F2) that is used for queue size extension. The legacy BSR A-control subfield includes an ACI (Access Category Identifier) Bitmap subfield and a Delta TID subfield, and the ACI Bitmap subfield and the Delta TID subfield have several combinations that are not applicable. Based on such observation, the present invention proposes using one of these non-applicable combinations to reuse the BSR A-control subfield for queue size extension. Hence, a value of a control ID subfield of the A-control subfield in the HT control field (i.e., second MAC header field F2) can be set by 3, indicating that a BSR A-control subfield is used by the HT control field (i.e., second MAC header field F2). When the BSR A-control subfield is not used for BSR control and reused for queue size extension, the format of the BSR A-control subfield should be properly redefined. The format of the BSR A-control subfield reused for queue size extension is illustrated in the following table.

TABLE 3

| Control ID value | ACI Bitmap | Delta TID | ACI High | Scaling Factor | Queue Size High | Queue Size All |
|---|---|---|---|---|---|---|
| 4 bits Set to 3 | 4 bits Set to 0 | 2 bits Set to 0 | 2 bits Reserved | 2 bits 2 bits | 8 bits Reserved | 8 bits 8 bits |

The subfield encoding of the 2-bit scaling factor subfield in the BSR A-control subfield reused for queue size extension is illustrate by the following table.

TABLE 4

| Scaling Factor Subfield | SF |
|---|---|
| 0 | 32768 |
| 1 | 32768*4 |
| 2 | 32768*16 |
| 3 | 32768*64 |

In this embodiment, the ACI bitmap subfield is set by 0 (i.e., the number of bits in the ACI Bitmap subfield that are set to 1 is equal to 0) and the Delta TID is set by 0, which results in a combination that is not applicable in the current 802.11 specification. In such combination of values of the ACI bitmap subfield and the Delta TID subfield, the ACI High subfield and the Queue Size High subfield are both reserved, and the Scaling Factor subfield and the Queue Size All subfield are used for queue size extension. For example, when the QS subfield <SF, UV> is set by <3, 62>, the AP can determine that the QS reported from the non-AP STA is 2,147,328+Scaling Factor*Queue Size All.

Figure 2:
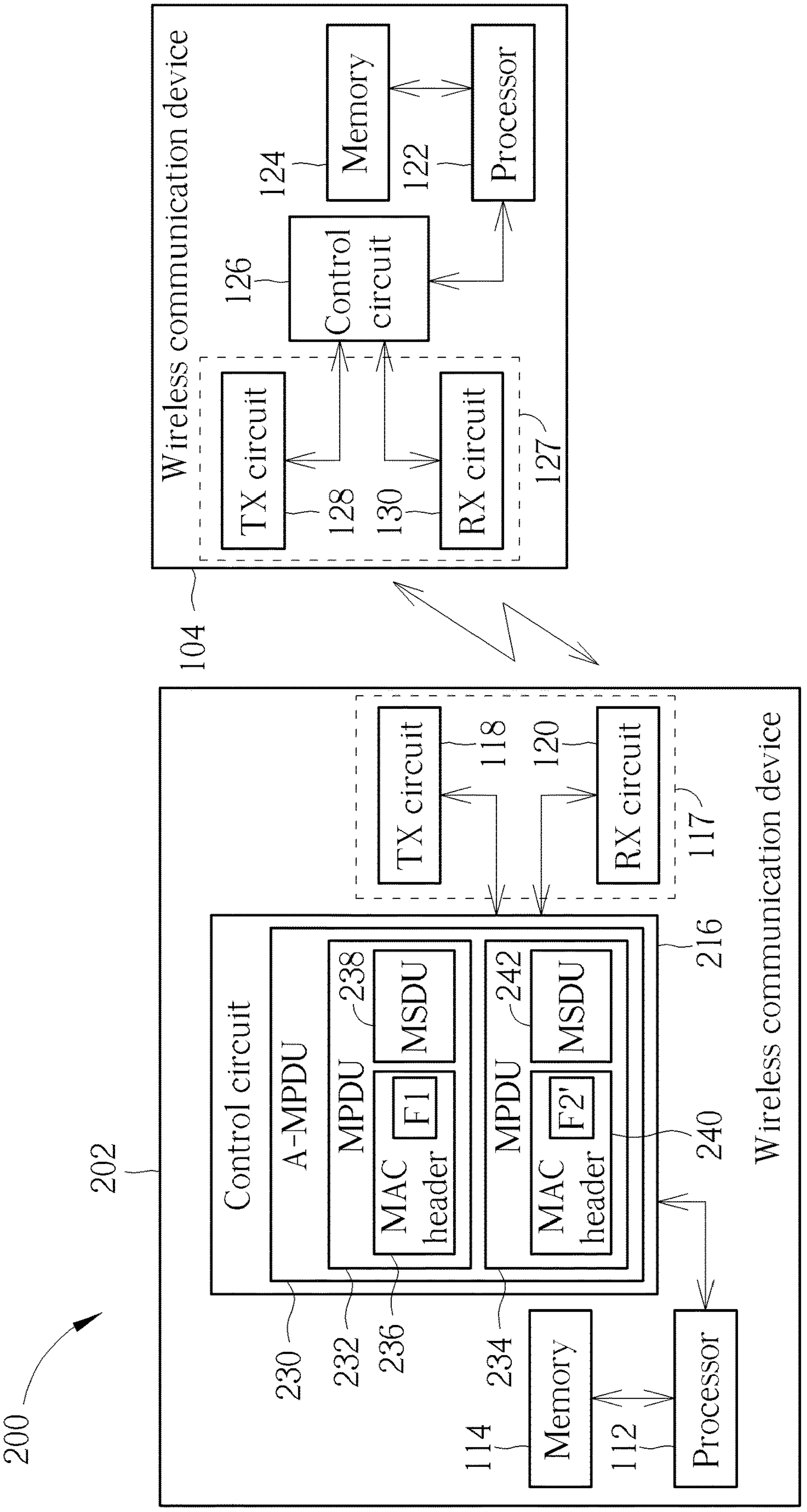
FIG. 2 is a diagram illustrating another wireless communication system that supports queue size extension according to an embodiment of the present invention.

FIG. 2 is a diagram illustrating another wireless communication system that supports queue size extension according to an embodiment of the present invention. The wireless communication system 200 includes a plurality of wireless communication devices 202 and 104. For example, the wireless communication system 200 is a Wi-Fi system, including an AP and a non-AP STA. In one embodiment of the present invention, the wireless communication device 202 may be a non-AP STA, and the wireless communication device 104 may be an AP. For brevity and simplicity, only two wireless communication devices 202 and 104 are shown in FIG. 2. In practice, the wireless communication system 200 is allowed to have more than two wireless communication devices, including an AP and more than one non-AP STA in the same BSS.

It should be noted that only the components pertinent to the present invention are illustrated in FIG. 2. In practice, the wireless communication device 202 may include additional components to achieve designated functions, and/or the wireless communication device 104 may include additional components to achieve designated functions.

In this embodiment, the wireless communication devices 202 and 104 both support the proposed queue size extension function. The wireless communication device (e.g., non-AP STA) 102 shown in FIG. 1 and the wireless communication device (e.g., non-AP STA) 202 may have the same or similar circuit structure. The major difference between the wireless communication devices 102 and 202 is that the control circuit 216 of the wireless communication device 202 generates an aggregate MAC protocol data unit (A-MPDU) 230 consisting of multiple MPDUs (e.g., a pair of MPDUs 232 and 234). The MPDU 232 is a first MAC frame including a MAC header 236 and an MSDU 238 (which is a frame body), where the MAC header 236 includes a first MAC header field F1. The MPDU 232 is a second MAC frame paired with the first MAC frame, and includes a MAC header 240 and an MSDU 242 (which is a frame body), where the MAC header 240 includes a second MAC header field F2'. The QS to be reported by the non-AP STA is encoded in the first MAC header field F1 and the second MAC header field F2'. It should be noted that each of the MPDUs 232 and 234 may also include an FCS (not shown).

Compared to the queue size extension function supported by the wireless communication system 100 that uses two MAC header fields F1 and F2 in the same MAC header, the queue size extension function supported by the wireless communication system 200 uses two MAC header fields F1 and F2' in different MAC headers. Like the second MAC header field F2 shown in FIG. 1, the second MAC header field F2 shown in FIG. 2 enables the non-AP STA to report an actual queue size larger than a maximum queue size that can be reported by the first MAC header field F1. The control circuit 216 of the wireless communication device (e.g., non-AP STA) 202 instructs the network interface circuit 117 (particularly, TX circuit 118 of network interface circuit 117) to send the A-MPDU 230 to the wireless communication device (e.g., AP) 104. For example, the A-MPDU 230 becomes a PSDU and is encapsulated into a PPDU for transmission. The network interface circuit 127 (particularly, RX circuit 130 of network interface circuit 127) of the wireless communication device (e.g., AP) 104 receives the PPDU, and the control circuit 126 of the wireless communication device (e.g., AP) 104 decapsulates the PPDU to obtain the A-MPDU 230, and obtains the reported QS of the wireless communication device (e.g., non-AP STA) 102 from parsing the first MAC header field F1 and the second MAC header field F2' included in the received A-MPDU 230.

In this embodiment, each of the first MAC header field F1 and the second MAC header F2' may be a QoS control field. Preferably, the MPDU 234 may be a QoS null frame. Since there is no data in the MSDU 242, the reported QS has no change by adding the MPDU 234 used to provide the additional second MAC header F2' needed for queue size extension. The first MAC header field F1 carried by the MPDU 232 may be a legacy QoS control field, and a QS subfield in the second MAC header field F2' carried by the MPDU 234 may act as an extension of a legacy QS subfield in the first MAC header field F1. For example, the legacy QS subfield consists of an SF and an UV with subfield encoding as illustrated in the following table.

TABLE 5

| Queue Size subfields | | |
|---|---|---|
| Scaling Factor (SF) | Unscaled Value (UV) | Queue Size (QS) |
| 0 | 0 | 0 |
| 0 | Ceil (QS, 16)/16 | 0 < QS ≤ 1008 |
| 1 | 0 | 1008 < QS ≤ 1024 |
| 1 | Ceil (QS-1024, 256)/56 | 1024 < QS ≤ 17152 |
| 2 | 0 | 17152 < QS ≤ 17408 |
| 2 | Ceil (QS-17408, 2048)/2048 | 17408 < QS ≤ 146432 |
| 3 | 0 | 146432 < QS ≤ 148480 |
| 3 | Ceil (QS-148480, 32768)/32768 | 148480 < QS ≤ 2147328 |

TABLE 5-continued

| Queue Size subfields | | |
|---|---|---|
| Scaling Factor (SF) | Unscaled Value (UV) | Queue Size (QS) |
| 3 | 62 | QS > 2147328 |
| 3 | 63 | Unspecified or unknown |

The QS subfield in the second MAC header field F2' carried by the MPDU 234 may not follow the subfield encoding of the legacy way as specified in Table 5. For example, all bits of the QS subfield in the second MAC header field F2' may be used to carry an 8-bit UVE value. For another example, the QS subfield in the second MAC header field F2' may be used to carry a 1-bit SF and a 7-bit UVE value.

When the wireless communication device (e.g., non-AP STA) 202 wants to report the QS larger than 2,147,328 octets (which is the maximum QS that can be reported by the QS subfield in the QoS control field), the control circuit 216 first sets the legacy QS subfield <SF, UV> of the QoS control field (i.e., first MAC header field F1) by <3, 62>, and then sets the QS subfield of the additional QoS control field (i.e., second MAC header field F2') to achieve the objective of reporting a more accurate and larger value than the maximum QS value supported by the legacy QS subfield.

The MPDUs 232 and 234 in the A-MPDU 230 may be transmitted together. Since the MPDU 232 is immediately followed by the MPDU 234, the MPDUs 232 and 234 may be considered as a pair. If the A-MPDU 230 has more than two MPDUs and the MPDUs 232 and 234 are not transmitted contiguously, extra identity may be added to the MPDUs 232 and 234, such that the AP can recognize the MPDUs 232 and 234 as a pair. However, this is for illustrative purposes only, and is not meant to be a limitation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method comprising:

generating at least one frame, wherein said at least one frame is configured to include a first medium access control (MAC) header field and a second MAC header field, and a queue size (QS) is encoded in the first MAC header field and the second MAC header field; and sending said at least one frame to an access point (AP);

wherein the first MAC header field indicates that the QS is larger than a maximum QS value supported by the first MAC header field, and the QS is reported with aid of the second MAC header field.

2. The wireless communication method of claim 1, wherein said at least one frame comprises only a single frame, and the first MAC header field and the second MAC header field are both included in a same MAC header of the single frame.

3. The wireless communication method of claim 2, wherein the first MAC header field is a quality of service (QoS) control field, and the second MAC header field is a high-throughput (HT) control field.

4. The wireless communication method of claim 3, wherein the QS is encoded in a QS subfield of the QoS control field and an aggregate-control (A-control) subfield of the HT control field.

5. The wireless communication method of claim 4, wherein the A-control subfield is a buffer status report (BSR) A-control subfield.

6. The wireless communication method of claim 4, wherein the A-control subfield acts as an extension of the QS subfield.

7. The wireless communication method of claim 6, wherein the A-control subfield comprises an unscaled value.

8. The wireless communication method of claim 7, wherein the A-control subfield further comprises a scaling factor.

9. The wireless communication method of claim 1, wherein said at least one frame comprises a first frame and a second frame in an aggregate MAC protocol data unit (A-MPDU), the first MAC header field is included in a MAC header of the first frame, and the second MAC header field is included in a MAC header of the second frame.

10. The wireless communication method of claim 9, wherein the second frame is a quality of service (QoS) null frame.

11. The wireless communication method of claim 9, wherein the first MAC header field is a first quality of service (QoS) control field, and the second MAC header field is a second QoS control field.

12. The wireless communication method of claim 11, wherein the QS is encoded in a first QS subfield of the first QoS control field and a second QS subfield of the second QoS control field, where subfield encoding of the second QS subfield is different from subfield encoding of the first QS subfield.

13. The wireless communication method of claim 12, wherein the second QS subfield acts as an extension of the first QS subfield.

14. The wireless communication method of claim 13, wherein the second QS subfield comprises an unscaled value.

15. The wireless communication method of claim 14, wherein the second QS subfield further comprises a scaling factor.

16. A wireless communication method comprising:

receiving at least one frame from a non-access-point (non-AP) station (STA), wherein said at least one frame includes a first medium access control (MAC) header field and a second MAC header field; and obtaining a queue size (QS) of the non-AP STA from parsing the first MAC header field and the second MAC header field;

wherein the first MAC header field indicates that the QS of the non-AP STA is larger than a maximum QS value supported by the first MAC header field, and the QS of the non-AP STA is reported with aid of the second MAC header field.

17. The wireless communication method of claim 16, wherein said at least one frame comprises only a single frame, and the first MAC header field and the second MAC header field are both included in a same MAC header of the single frame.

18. The wireless communication method of claim 17, wherein the first MAC header field is a quality of service (QoS) control field, and the second MAC header field is a high-throughput (HT) control field.

19. The wireless communication method of claim 16, wherein said at least one frame comprises a first frame and a second frame included in an aggregate MAC protocol data unit (A-MPDU), the first MAC header field is included in a MAC header of the first frame, and the second MAC header field is included in a MAC header of the second frame.

20. A wireless communication device comprising:

a network interface circuit; and a control circuit, arranged to generate at least one frame, and instruct the network interface circuit to send said at least one frame, wherein said at least one frame is configured to include a first medium access control (MAC) header field and a second MAC header field, and a queue size (QS) is encoded in the first MAC header field and the second MAC header field;

wherein the first MAC header field indicates that the QS is larger than a maximum QS value supported by the first MAC header field, and the QS is reported with aid of the second MAC header field.

* * * * *